United States Patent [19]

McKinsey et al.

[11] Patent Number: 4,763,761

[45] Date of Patent: Aug. 16, 1988

[54] LIFTING DEVICE

[76] Inventors: Millard F. McKinsey; David L. Knoebel, both of R.R. 1, Maquoketa, Iowa 52060; Jesse A. Cram, R.R. 3, Bellevue, Iowa 52031; Larry N. Kilburg, R.R. 2, Maquoketa, Iowa 52060

[21] Appl. No.: 19,710

[22] Filed: Feb. 27, 1987

[51] Int. Cl.[4] .............................................. B60S 13/00

[52] U.S. Cl. .................................... 187/8.41; 254/45; 254/89 R

[58] Field of Search .................... 187/8.41, 8.59, 8.47, 187/9 E, 20; 414/629, 630; 254/45, 49, 50, 89 H, 89 R; 52/721; 182/2, 83, 141

[56] References Cited

U.S. PATENT DOCUMENTS

| | | | |
|---|---|---|---|
| 488,274 | 12/1892 | Gray | 52/721 |
| 3,338,334 | 8/1967 | Matthews | 187/8.59 |
| 3,536,161 | 10/1970 | Clarke | 187/8.41 |
| 3,536,162 | 10/1970 | Clarke | 187/8.41 |
| 3,706,356 | 12/1972 | Herbst et al. | 187/8.41 |
| 4,230,304 | 10/1980 | Tol | 254/89 H |
| 4,545,462 | 10/1985 | Sul | 254/89 H |
| 4,674,938 | 6/1987 | Stokes et al. | 254/89 H |

FOREIGN PATENT DOCUMENTS

| | | | |
|---|---|---|---|
| 1124706 | 6/1982 | Canada | 254/89 H |
| 1432367 | 4/1976 | United Kingdom | 52/721 |
| 566911 | 7/1977 | U.S.S.R. | 52/721 |

*Primary Examiner*—Joseph J. Rolla
*Assistant Examiner*—Kenneth Noland
*Attorney, Agent, or Firm*—Robert O. Richardson

[57] ABSTRACT

A lifting device for lifting automobiles and similar loads wherein substantially equal loads are applied to both sides of the load and wherein an additional force is applied to the heavier side when the load is unevenly distributed. All power and compensating lines are connected over the load, leaving the area under the load free and available for auxiliary equipment.

4 Claims, 3 Drawing Sheets

LIFTING DEVICE

BACKGROUND OF THE INVENTION

Lifting devices for raising automobiles and other objects having an irregular distribution of weight are well known. They have a base, a frame on which the object is placed, and a lifting mechanism for raising the frame and object.

The lifting mechanism usually consists of a pair of interconnected hydraulic lifters with the hydraulic lines and equalizing cables on the floor. A protective floor cover is provided to protect the lines from damage by dollies, carts or lifts that are used to install or remove auto parts, such as a transmission for example. However, this cover provides a bump which is an obstacle in the movement of these auxilliary devices.

In another version a cross-bar at the top connects with the vertical base beams. The hydraulic lines and equalizing cables are placed on the cross-bar to eliminate the need for the protective floor cover that was a hinderance in the first version. However, having the cross-bar at a fixed height posed the problem of damaging the lifted object if it was lifted too high. A sensing device was needed to halt the vertical rise when the object got too close to the cross-bar. This type was unsuitable when used with limited ceiling space.

SUMMARY OF THE PRESENT INVENTION

In accordance with the present invention a lifting device is provided which consists of a base of two vertical columns, a vertically moving carriage for lifting an object such as an automobile power lifting apparatus, safety features and a weight and lift equalizing apparatus. The vertically moving carriage includes the cross-bar with its hydraulic lines and equalizing cables in its vertical movement. In this manner the cross-bar is always spaced the same distance above the object being lifted and no sensing device with shutoff is needed. The cross-bar connected to the part of the vertically movable carriage takes the twisting load off the bearing surfaces on the non-movable column. The cross-bar connection with and on the vertical lifters of the carriage is such that the assembly can be conveniently done by one assembler without assistance. If one side fails or slips, the whole unit locks up so it won't tilt or cant too far and spill the object being lifted.

Equalizing cables are used to apply additional lift to the side of the moveable carriage having the heavier load. Since either side may have the heavier load, a pair of cables is used, one for each side. The ends of the cables are attached to the base on one side and to the upper end of the base column on the other. The cable extends over a pair of pulleys and under another pulley on the moveable frame. When the heavier weight is on the same side of the frame as the pulley having the cable under it, the cable exerts an extra lifting force on the pulley to compensate for the added weight on that side of the frame. The second cable has pulleys arranged as a mirror image to the first to compensate for added weight on the opposite side of the frame.

If the hydraulic lift structure or the force equalizing apparatus fails, safety apparatus is provided to prevent excessive tilt or cant that might cause the object being lifted to spill over and be damaged.

DETAILED DESCRIPTION OF ILLUSTRATIVE EMBODIMENT

Figure 1:
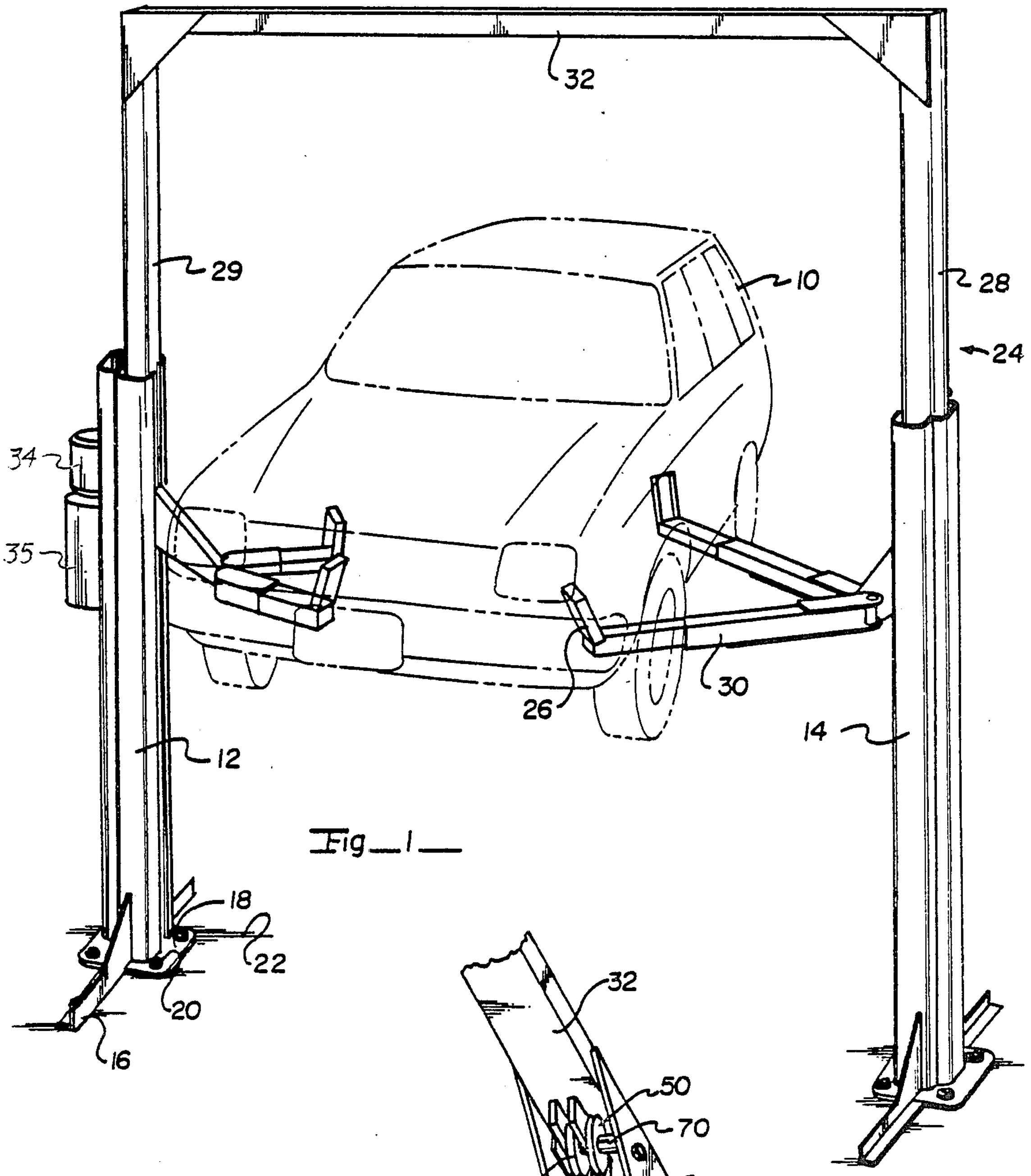
FIG. 1 is a front view of the lifting device in raised position with the lifted object shown in dashed lines.

Reference is now made to FIG. 1 wherein is shown the lift device of the present invention with an automobile 10, shown in phantom lines, in its lifted position. The lift device includes a pair of vertical support columns 12, 14, having integral outriggers 16, and base plates 18, at their lower ends with fasteners 20, for interfacing with the underlying support medium, such as a concrete floor 22, for example.

The lifting device also includes a vertically moveable lifting carriage 24, comprising adjustable contact platforms 26, that engage the load to be raised. These platforms are connected to lifting columns 28 and 29 by means of pivotal, telescopically adjustable arms 30. Extending across and positioned on the tops of the two lifting columns 28, 29 is an overhead horizontal spacer 32. This spacer maintains a constant distance between upper pulleys (shown in FIG. 3) and moves vertically with the lifting columns 28, 29 and load 10. This spacer resists torsional loads imparted on the lifting columns. It also supports overhead hydraulic lines and equalizer and safety cables to be described hereinafter. By routing these over the load, there is unrestricted access beneath the load when lifted. The lifting carriage 24, is moved vertically by means of linear actuators such as hydraulic pumps or cylinders 35 operated by a prime mover such as an electric motor 34, for example.

As will hereinafter be described with reference to FIG. 5, the lifting columns 28, 29 are equipped with positive engagement mechanical locking safety devices capable of maintaining the load in any of a number of raised positions should a failure occur with the prime mover or actuators. This also prevents excessive tilt that otherwise might cause the load to spill.

When the load is not distributed uniformly, an actuator on one side or the other is subjected to an additional weight, creating uneven reaction to equal lifting forces. To compensate for an unequal load distribution and to stabilize the load, displacement equalizing apparatus synchronizes the movement of the lifting carriage lifting columns 28 and 29. This is done in the manner shown in FIG. 2, with two cables 36, 38, having their ends 40, 42, 44, 46, fastened to the support columns 12, 14. These cables pass over four pulleys 48, 50, 52, 54, mounted at the tops of the lifting columns 28, 29, and under pulleys 56, 58, mounted at the bottom of the lifting columns. The cables cross over and are supported between the columns 28, 29, by the horizontal spacer 32.

Figure 2:
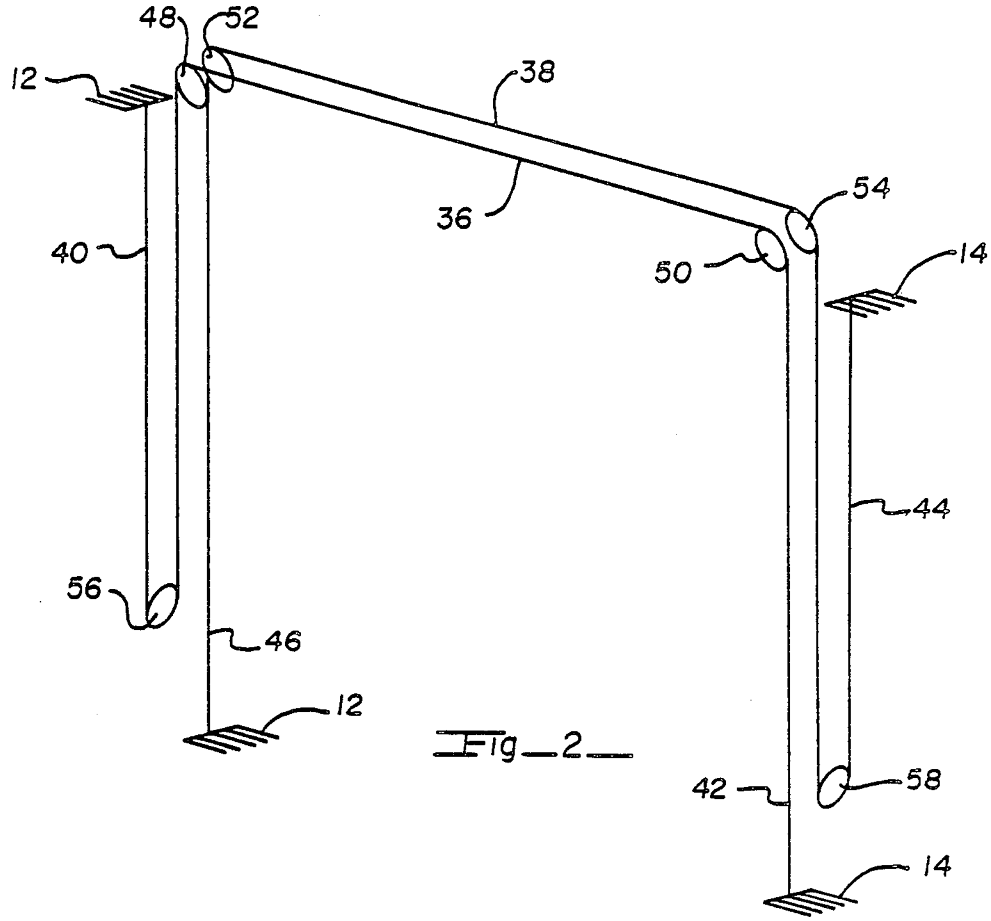
FIG. 2 is a schematic illustration showing the arrangement of the weight and lift equalizing components.

As an example of how the displacement equalizing apparatus in FIG. 2 works, assume the load bears more heavily to the left. The hydraulic lifts on both lifting columns are hydraulically connected so that equal pressure is exerted on each. However, the opposing force of the extra weight is on the left lifting column to which pulleys 48, 56 are attached. Cable 36, fastened at its ends 40, 42, to the support columns 12, 14 passes under pulley 56 and over pulley 48. Cable 36 continues on spacer 32 and over pulley 50 to its terminal at 42. Now as the hydraulic lifts move the lifting columns 28, 29, upwardly, cable 36 moves from left to right over pulley 50 and pulley 48. This lifts pulley 56 upwardly, adding an additional lifting force to the side of the heavier load.

As a second example of how the displacement equalizing apparatus in FIG. 2 works, assume the load bears more heavily to the right. In this case cable 38 applies a lifting force to pulley 58. Since cable 38 is attached to support column 12 at 46 and to support column 14 at 44, any upward movement of the lifting columns 28, 29, moves cable 38 to the left over pulley 52 and over pulley 54. This urges pulley 58 upwardly to assist the lifting force of the hydraulic lift on the right or heavier side.

When the load is balanced evenly between the two lifting columns 28, 29, both cables are freerunning over their respective pulleys and assure an equal lifting contribution to both sides.

Figure 3:
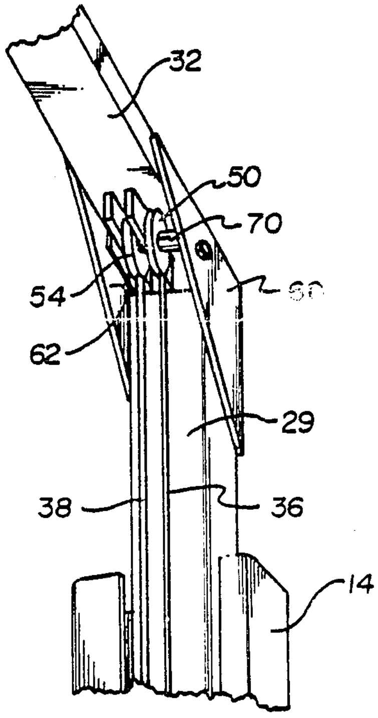
FIG. 3 is a perspective view of the upper right carriage corner.
Figure 4:
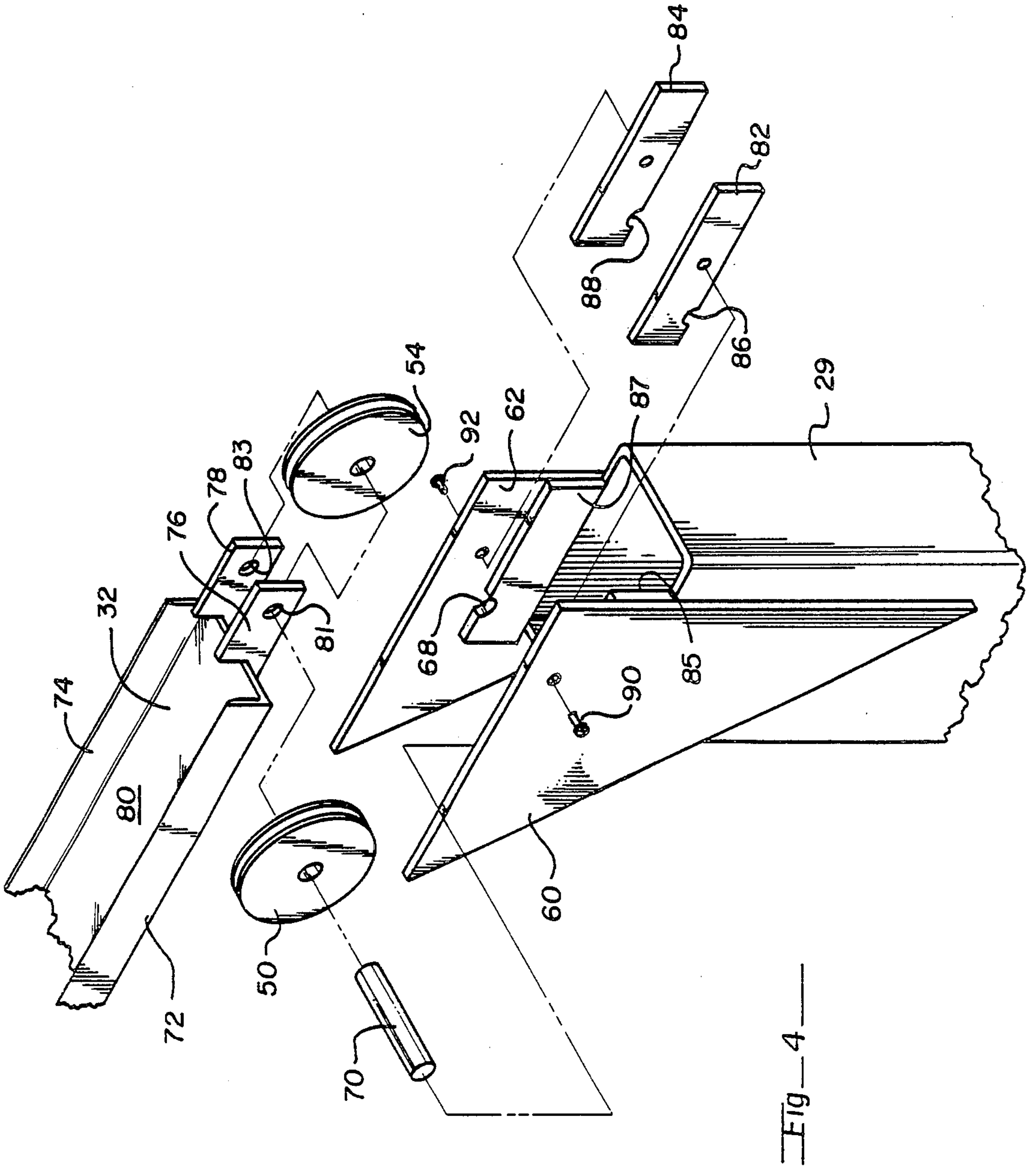
FIG. 4 is an exploded view in perspective of the upper right carriage corner shown in FIG. 3.

FIGS. 3 and 4 illustrate the assembly of the horizontal spacer 32, on top of lifting column 29. Usually the lifting device of the present invention is shipped from the factory with each half, i.e., the support and lifting columns 12, 14, 28 and 29 assembled. The horizontal spacer 32, is then added at the installation site prior to connecting the equalizer cables and hydraulic lines over the spacer.

Triangular side plates 60, 62, are welded to the top of lifting column 29 with shaft supports 64, 66, attached thereto and resting on the top edges of the lifting column. These shaft supports have semi-circular recesses 68, which serve as bearing surfaces for the ends of pulley shaft 70.

The horizontal spacer 32 is of U-shaped cross-section and has a pair of vertical ribs 72, 74, between which equalizer cables and hydraulic lines will be placed after the spacer is installed.

Each end of spacer 32, has a pair of attachment lugs 76, 78, having apertures 81, 83, therein to receive pulley shaft 70. These lugs are so spaced on the base portion 80, of the spacer 32, that pulley 54, will fit in between the lugs and pulley 50 will fit between lug 76 and shaft support 85 when assembled. There is a space between rib 74 and lug 78 on the order of approximately one-half inch to accommodate a hydraulic line and a safety cable.

In assembly the pulleys 50, 54, are first mounted on lugs 76, 78, by pulley shaft 70. Spacer 32 is then positioned so that the ends of pulley shaft 70 are seated in recesses 68 of shaft supports 85, 87. Retainer plates 82, 84, with semi-circular recesses 86, 88, are then placed over shaft supports 85, 87, with recesses 86, 88, over the pulley shaft ends. They are held in place by retainer bolts 90, 92, so that they may be removed for maintenance and/or repair purposes. The purpose of retainer plates 82, 84 is to keep shaft 70 in recesses 68 of shaft supports 85, 87. Other retainer means are possible.

Figure 5:
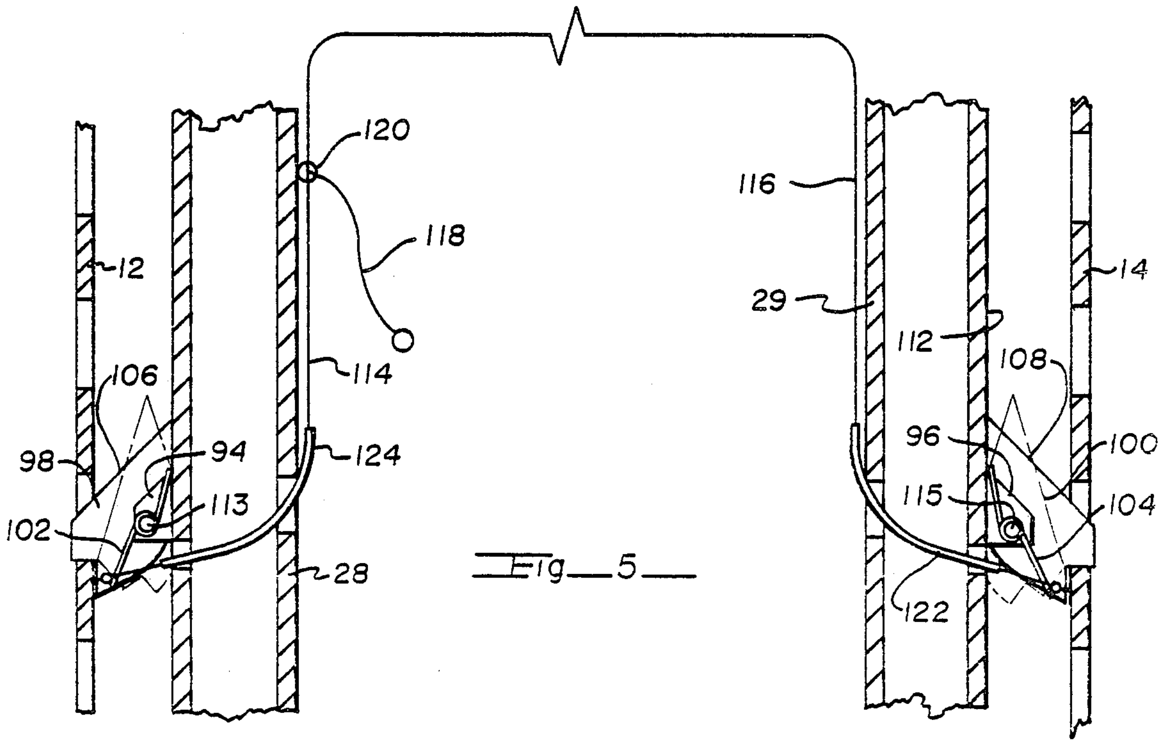
FIG. 5 is a sectional view of a part of the lifting device showing its safety feature.

FIG. 5 shows the safety structure to prevent excessive tilt or sudden drop should there be a failure or breakage in the lifting apparatus. A fragmental portion of support columns 12, 14, and lifting columns 28 and 29 is shown in cross-section. Between each support column structure and its associated lifting column structure and attached to the lifting column are mounting lugs 94, 96, to which catches 98, 100, respectively are pivotally mounted. Springs 102, 104, urge the catches 98, 100 to engage the bottom edge of associated slots 102, 104, on the back surface of support columns 12, 14. Each support column has a plurality of slots along the path of vertical travel of the catches as the lifting columns move from their low to raised positions. The catches have tapered top surfaces 106, 108, which engage the top edges of the slots and depress as the lifting columns are raised. As the lifting columns are lowered the springs 102, 104, urge catches 98, 100, into the next lower slots to halt further downward movement of the lifting columns. The rear edges 110, 112, of catches 98, 100, contact the surfaces of the lifting columns above and inwardly from the catches' pivot points 113, 115. Since the catches contact the slots by catch surfaces that are lower and outwardly of the catches' pivot points, the downward weight of the lift object causes the catches to jam even more tightly as an additional safety measure.

When in normal use the lowering of the lifting carriage, 24, in FIG. 1, is desired, the safety structure thus described must be disabled. This is done by rotating the catches 98, 100, from the locking position shown in FIG. 5 to the unlocked position shown in phantom lines. To do this, the catches are rotated by pulling the lower portion back from its alignment with the vertical plane of the slots in the support columns. This is done through cables 114, 116, connected to the lower ends of catches 98, 100. These cables are interconnected to a release lanyard 118 at a cable guide 120, on lifting column 28. Cable 116 passes up and over the load by its placement over horizontal spacer 32. This lanyard 118 must be pulled and held when the lifting apparatus is being lowered. Cables 114 and 116 are routed through tubes 122, 124 in openings in the lifting columns 28 and 29 for anti-snagging assurance.

This invention in its broader aspects is not limited to the specific combinations, improvements and instrumentalities described and departures may be made therefrom within the scope of the accompanying claims without departing from the principles of the invention and without sacrificing its chief advantages.

What is claimed is:

1. A lifting device for lifting objects having even and uneven weight distributions comprising:

a pair of support columns having lifting columns vertically moveable relative thereto, said lifting columns having load contact platforms at the lower ends thereof for lifting a load therebetween, said lifting columns having an overhead horizontal spacer connecting the upper ends thereof and vertically moveable therewith, said lifting columns, said contact platforms and said horizontal spacer comprising a lifting carriage that raises and lowers as a unit, said lifting columns having a single source fluid pressure lifting mechanism supplying substantially equal lifting power to each lifting column through interconnecting fluid pressure conducting transmission lines, equalizing cables connected at their ends to said support columns, pulleys mounted on said lifting columns, said cables passing over said pulleys, said cables applying an additional lifting force to the lifting column being subjected to an additional load of said object having an uneven weight distribution, said pulleys comprising a pair of upper pulleys at each end of said spacer and a lower pulley near the lower end of each support column, said cables passing over said upper pulleys and under said lower pulleys.

2. A lifting device as in claim 1, wherein all said interconnecting fluid pressure lines and cables between columns on opposing sides of said object to be lifted are routed over said horizontal spacer and are moveable therewith.

3. A lifting device for lifting objects having even and uneven weight distributions comprising:

a pair of support columns having lifting columns vertically moveable relative thereto, said lifting columns having load contact platforms at the lower ends thereof for lifting a load therebetween, said lifting columns having an overhead horizontal spacer connecting the upper ends thereof and vertically moveable therewith, said lifting columns, said contact platforms and said horizontal spacer comprising a lifting carriage that raises and lowers as a unit, said lifting columns having a single source fluid pressure lifting mechanism supplying substantially equal lifting power to each lifting column through interconnecting fluid pressure conducting transmission lines, each of said lifting columns having a pair of side plates attached thereto, a pair of shaft supports attached to said side plates and resting on the top edges of said lifting columns, said spacer having a pair of connecting lugs with shaft receiving apertures therein, a pulley shaft on said shaft supports extending through said apertures in said connecting lugs, a pair of pulleys rotatably mounted on said pulley shaft, retainer means attached to said side plates over said pulley shaft to prevent accidental removal thereof, said pulleys having cables passing thereover for applying additional loads to said lifting columns.

4. A lifting device for lifting objects having even and uneven weight distributions comprising:

a pair of support columns having lifting columns vertically moveable relative thereto, said lifting columns having load contact platforms at the lower ends thereof for lifting a load therebetween, said lifting columns having an overhead horizontal spacer connecting the upper ends thereof and vertically moveable therewith, said lifting columns, said contact platforms and said horizontal spacer comprising a lifting carriage that raises and lowers as a unit, said lifting columns having a single source fluid pressure lifting mechanism supplying substantially equal lifting power to each lifting column through interconnecting fluid pressure conducting transmission lines, equalizing cables connected at their ends to said support columns, pulleys mounted on said lifting columns, said cables passing over said pulleys, said cables applying an additional lifting force to the lifting column being subjected to an additional load of said object having an uneven weight distribution, a pair of side plates attached to each lifting column, a pair of shaft supports affixed thereto and resting on the top edges of said lifting columns, said spacer having a pair of connecting lugs with shaft receiving apertures therein, and a shaft on said shaft supports extending through said apertures in said connecting lugs.

* * * * *